(12) United States Patent
Kaneko et al.

(10) Patent No.: US 8,815,026 B2
(45) Date of Patent: Aug. 26, 2014

(54) HIGH STRENGTH GALVANIZED STEEL SHEET EXCELLENT IN FORMABILITY

(75) Inventors: Shinjiro Kaneko, Tokyo (JP); Yoshiyasu Kawasaki, Tokyo (JP); Saiji Matsuoka, Tokyo (JP); Yoshitsugu Suzuki, Tokyo (JP); Koji Maitake, Tokyo (JP)

(73) Assignee: JFE Steel Corporation (JP)

( * ) Notice: Subject to any disclaimer, the term of this patent is extended or adjusted under 35 U.S.C. 154(b) by 177 days.

(21) Appl. No.: 12/864,766

(22) PCT Filed: Dec. 12, 2008

(86) PCT No.: PCT/JP2008/073129
§ 371 (c)(1),
(2), (4) Date: Jul. 27, 2010

(87) PCT Pub. No.: WO2009/069115
PCT Pub. Date: Aug. 6, 2009

(65) Prior Publication Data
US 2010/0314009 A1 Dec. 16, 2010

(30) Foreign Application Priority Data
Jan. 31, 2008 (JP) ................................. 2008-020176

(51) Int. Cl.
| | | |
|---|---|---|
| *C22C 38/32* | (2006.01) | |
| *C22C 38/38* | (2006.01) | |
| *C22C 38/28* | (2006.01) | |
| *C23C 30/00* | (2006.01) | |
| *C23C 2/02* | (2006.01) | |
| *C23C 2/06* | (2006.01) | |
| *C22C 38/02* | (2006.01) | |
| *C21D 9/48* | (2006.01) | |
| *C22C 38/06* | (2006.01) | |
| *C22C 38/00* | (2006.01) | |
| *C23C 2/28* | (2006.01) | |

(52) U.S. Cl.
CPC ... *C23C 2/06* (2013.01); *C23C 2/02* (2013.01); *C22C 38/02* (2013.01); *C22C 38/38* (2013.01); *C21D 9/48* (2013.01); *C22C 38/28* (2013.01); *C22C 38/06* (2013.01); *C22C 38/32* (2013.01); *C22C 38/001* (2013.01); *C23C 2/28* (2013.01)
USPC ............................ 148/330; 148/333; 428/659

(58) Field of Classification Search
USPC .................. 148/320, 333–336, 533; 428/659
See application file for complete search history.

(56) References Cited

U.S. PATENT DOCUMENTS

| | | |
|---|---|---|
| 2008/0000555 A1 | 1/2008 | Nonaka et al. |
| 2009/0314395 A1 | 12/2009 | Nonaka et al. |

FOREIGN PATENT DOCUMENTS

| | | | |
|---|---|---|---|
| JP | 9-013147 A | | 1/1997 |
| JP | 11-279691 A | | 10/1999 |
| JP | 2001-192768 A | | 7/2001 |
| JP | 2001-207235 A | | 7/2001 |
| JP | 2001-207235 A | * | 7/2001 |
| JP | 2002-069574 A | | 3/2002 |
| JP | 2003-055751 A | | 2/2003 |
| JP | 2005-213603 A | | 8/2005 |
| JP | 2006-104532 A | | 4/2006 |

OTHER PUBLICATIONS

Machine-English translation of Japanese patent 2001-207235, Osawa Kazunori et al., Jul. 31, 2001.*

* cited by examiner

*Primary Examiner* — Deborah Yee
(74) *Attorney, Agent, or Firm* — DLA Piper LLP (US)

(57) ABSTRACT

A high strength galvanized steel sheet having a TS of 780 MPa or more and exhibiting excellent stretch frangeability and bendability and a method for manufacturing the same are provided. The component composition contains C: 0.05% to 0.15%, Si: 0.8% to 2.5%, Mn: 1.5% to 3.0%, P: 0.001% to 0.05%, S: 0.0001% to 0.01%, Al: 0.001% to 0.1%, N: 0.0005% to 0.01%, Cr: 0.1% to 1.0%, Ti: 0.0005% to 0.1%, B: 0.0003% to 0.003%, and the remainder composed of iron and incidental impurities, on a percent by mass basis. The microstructure includes 30% or more of ferrite phase and 30% or more, and 70% or less of martensite phase on an areal fraction basis, wherein regarding the above-described martensite phase, the proportion of a tempered martensite phase is 20% or more relative to the whole martensite phase and the proportion of a martensite phase having a grain diameter of 1 μm or less is 10% or less relative to the whole martensite phase.

2 Claims, No Drawings

HIGH STRENGTH GALVANIZED STEEL SHEET EXCELLENT IN FORMABILITY

RELATED APPLICATIONS

This is a §371 of International Application No. PCT/JP2008/073129, with an inter-national filing date of Dec. 12, 2008 (WO 2009/096115 A1, published Aug. 6, 2009), which is based on Japanese Patent Application No. 2008-020176, filed Jan. 31, 2008, the subject matter of which is incorporated by reference.

TECHNICAL FIELD

This disclosure relates to a high strength galvanized steel sheet excellent in formability and suitable for a structural member mainly and a method for manufacturing the same. In particular, it relates to a high strength galvanized steel sheet having a tensile strength TS of 780 MPa or more and exhibiting excellent elongation, e.g., stretch frangeability and bendability, and a method for manufacturing the same.

BACKGROUND

In recent years, for the purposes of ensuring the safety of occupants in crash and improving a fuel efficiency because of car body weight reduction, application of a high strength steel sheet having a TS of 780 MPa or more and a small sheet thickness to an automobile structural member has been promoted intensively. Particularly in recent years, application of an extremely high strength steel sheet having a TS of a 980 MPa level or a 1,180 MPa level has been discussed.

However, in general, an increase in strength of a steel sheet causes deterioration of the elongation, the stretch frangeability, the bendability, and the like of the steel sheet and leads to deterioration of the formability. Therefore, a galvanized steel sheet having the high strength and excellent formability in combination and, furthermore, exhibiting excellent corrosion resistance has been desired under the present circumstances.

In response to such demands, for example, JP 9-13147 proposes a high strength galvannealed steel sheet having a TS of 800 MPa or more and exhibiting excellent formability and excellent adhesion of the coating, wherein a galvannealed layer is provided on a surface layer of a steel sheet containing C: 0.04% to 0.1%, Si: 0.4% to 2.0%, Mn: 1.5% to 3.0%, B: 0.0005% to 0.005%, P≤0.1%, 4N<Ti≤0.05%, Nb≤0.1%, and the remainder composed of Fe and incidental impurities, on a percent by mass basis, the Fe % in the galvannealed layer is 5% to 25%, and the microstructure of the steel sheet is a mixed microstructure of a ferrite phase and a martensite phase.

JP 11-279691 discloses a high strength galvannealed steel sheet exhibiting good formability, wherein C: 0.05% to 0.15%, Si: 0.3% to 1.5%, Mn: 1.5% to 2.8%, P: 0.03% or less, S: 0.02% or less, Al: 0.005% to 0.5%, N: 0.0060% or less, and the remainder composed of Fe and incidental impurities are contained, on a percent by mass basis, (Mn %)/(C %)≥15 and (Si %)/(C %)≥4 are satisfied, and 3% to 20% of martensite phase and retained austenite phase on a volume fraction basis are contained in a ferrite phase.

JP 2002-69574 discloses a high strength coated steel sheet with low yield ratio, the steel sheet exhibiting excellent stretch frangeability, wherein C: 0.04% to 0.14%, Si: 0.4% to 2.2%, Mn: 1.2% to 2.4%, P: 0.02% or less, S: 0.01% or less, Al: 0.002% to 0.5%, Ti: 0.005% to 0.1%, N: 0.006% or less, and the remainder composed of Fe and incidental impurities, on a percent by mass basis, are contained, (Ti %)/(S %)≥5 is satisfied, the volume fraction of a martensite phase and a retained austenite phase is 6% or more in total, and α≤50,000×{(Ti %)/48+(Nb %)/93+(Mo %)/96+(V %)/51} is satisfied, where the volume fraction of a hard phase microstructure of the martensite phase, the retained austenite phase, and a bainite phase is assumed to be α%.

JP 2003-55751 discloses a high strength galvanized steel sheet excellent in adhesion of the coating and elongation in formation, the galvanized steel sheet including a coating layer containing Al: 0.001% to 0.5%, Mn: 0.001% to 2%, and the remainder composed of Zn and incidental impurities, on a percent by mass basis, on a surface of a steel sheet containing C: 0.001% to 0.3%, Si: 0.01% to 2.5%, Mn: 0.01% to 3%, Al: 0.001% to 4%, and the remainder composed of Fe and incidental impurities, on a percent by mass basis, wherein a Si content of steel: X percent by mass, a Mn content of steel: Y percent by mass, an Al content of steel: Z percent by mass, an Al content of coating layer: A percent by mass, and a Mn content of coating layer: B percent by mass satisfy 0≤3−(X+Y/10+Z/3)−12.5×(A−B), and the microstructure of the steel sheet includes 70% to 97%, on a volume fraction basis, of primary ferrite phase having an average grain diameter of 20 μm or less and 3% to 30%, on a volume fraction basis, of austenite phase and/or martensite phase serving as a secondary phase having an average grain diameter of 10 μm or less.

However, regarding high strength galvanized steel sheets described in JP 9-13147, JP 11-279691, JP 2002-69574 and JP 2003-55751, excellent stretch frangeability and bendability are not always exhibited.

In consideration of the above-described circumstances, it could be helpful to provide a high strength galvanized steel sheet having a TS of 780 MPa or more and exhibiting excellent stretch frangeability and bendability and a method for manufacturing the same.

SUMMARY

We conducted intensive research to obtain a high strength galvanized steel sheet having a TS of 780 MPa or more and exhibiting excellent stretch frangeability and bendability and found the following:

i) The TS of 780 Mpa or more and excellent stretch frangeability and bendability can be achieved by controlling the component composition and, in addition, specifying the microstructure in such a way as to include 30% or more of ferrite phase and 30% or more, and 70% or less of martensite phase on an areal fraction basis, wherein regarding the martensite phase, a tempered martensite phase constitutes 20% of the whole martensite phase and a martensite phase having a grain diameter of 1 μm or less constitutes 10% or less of the whole martensite phase.

ii) The above-described microstructure can be obtained by conducting heating to a temperature range higher than or equal to the Ac1 transformation point at an average heating rate of 5° C./s or more in annealing, conducting soaking for 30 to 500 s in a specific temperature range determined on the basis of a chemical composition, conducting cooling to a temperature range lower than or equal to 550° C. at an average cooling rate of 3° C./s to 30° C./s and, thereafter, conducting galvanization.

We thus provide:

[1] A high strength galvanized steel sheet excellent in formability, characterized by having a component composition containing C: 0.05% to 0.15%, Si: 0.8% to 2.5%, Mn: 1.5% to 3.0%, P: 0.001% to 0.05%, S: 0.0001% to 0.01%, Al: 0.001% to 0.1%, N: 0.0005% to 0.01%, Cr: 0.1% to 1.0%, Ti: 0.0005% to 0.1%, B: 0.0003% to 0.003%, and the remainder composed of iron and incidental impurities, on a percent by mass basis, and a microstructure including 30% or more of ferrite phase and 30% or more, and 70% or less of martensite phase on an areal fraction basis, wherein regarding the above-described martensite phase, the proportion of a tempered martensite phase is 20% or more relative to the whole martensite phase and the proportion of a martensite phase having a grain diameter of 1 µm or less is 10% or less relative to the whole martensite phase.

[2] The high strength galvanized steel sheet excellent in formability, according to the above-described item [1], characterized in that the average grain diameter of the above-described ferrite phase is 3 µm or more.

[3] The high strength galvanized steel sheet excellent in formability, according to the above-described item [1] or item [2], characterized in that the average grain diameter of the above-described martensite phase is 2 µm or more.

[4] The high strength galvanized steel sheet excellent in formability, according to any one of the above-described items [1] to [3], characterized in that the component composition further contains Nb: 0.0005% to 0.05% on a percent by mass basis.

[5] The high strength galvanized steel sheet excellent in formability, according to any one of the above-described items [1] to [4], characterized in that the component composition further contains at least one type of element selected from Mo: 0.01% to 1.0%, Ni: 0.01% to 2.0%, and Cu: 0.01% to 2.0% on a percent by mass basis.

[6] The high strength galvanized steel sheet excellent in formability, according to any one of the above-described items [1] to [5], characterized in that the component composition further contains Ca: 0.001% to 0.005% on a percent by mass basis.

[7] The high strength galvanized steel sheet excellent in formability, according to any one of the above-described items [1] to [6], characterized in that the galvanization is galvanneal.

[8] A method for manufacturing a high strength galvanized steel sheet excellent in formability, characterized by including the steps of heating a steel sheet having the component composition according to any one of the above-described items [1], and [4] to [6] to a temperature range higher than or equal to the Ac1 transformation point at an average heating rate of 5° C./s or more, conducting soaking for 30 to 500 s in a temperature range of $(Ac_3-Ti \times T2)$° C. or higher to the Ac3 transformation point or lower, conducting cooling to a temperature range of 550° C. or lower at an average cooling rate of 3° C./s to 30° C./s, conducting galvanization and, thereafter, conducting cooling at an average cooling rate of 30° C./s or less, while the above-described T1 and T2 are represented by Formula (1) and Formula (2) described below:

$$T1 = 120 + 22.5(\% \text{ Si}) - 40(\% \text{ Cr}) \quad \text{Formula (1)}$$

$$T2 = 0.3 + 0.075(\% \text{ Cr}) \quad \text{Formula (2)}$$

where in Formulae, (% M) represents a content (percent by mass) of an element M in the steel.

[9] The method for manufacturing a high strength galvanized steel sheet excellent in formability, according to the above-described item [8], characterized in that a heat treatment in a temperature range of 300° C. to 500° C. for 20 to 150 s is conducted after the soaking and the cooling before the galvanization is conducted.

[10] The method for manufacturing a high strength galvanized steel sheet excellent in formability, according to the above-described item [8] or item [9], characterized in that after the galvanization is conducted, an alloying treatment of the galvanization is conducted in a temperature range of 450° C. to 600° C. before the cooling.

Every % indicating the component of a steel is on a percent by mass basis. Furthermore, "high strength galvanized steel sheet" refers to a galvanized steel sheet having a tensile strength TS of 780 MPa or more.

A high strength galvanized steel sheet having a TS of 780 MPa or more and exhibiting excellent stretch frangeability and bendability can be obtained. The safety of occupants can be further ensured and a fuel efficiency can be improved because of significant car body weight reduction by applying the high strength galvanized steel sheet to an automobile structural member.

DETAILED DESCRIPTION

Our steel sheets and methods will be described below in detail.

1) Component Composition

C: 0.05% to 0.15%

An element C is important for strengthening a steel and has a high solid solution strengthening ability. In addition, in taking advantage of microstructure strengthening due to a martensite phase, C is an element indispensable for adjusting the areal fraction and hardness. If the amount of C is less than 0.05%, it becomes difficult to obtain a martensite phase having a required areal fraction. Furthermore, since the martensite phase does not become hard, sufficient strength is not obtained. On the other hand, if the amount of C exceeds 0.15%, weldability deteriorates and, in addition, deterioration of formability is caused by formation of a segregation layer. Therefore, the amount of C is specified to be 0.05% or more, and 0.15% or less.

Si: 0.8% to 2.5%

Si is very important. In the steps from annealing to cooling, ferrite transformation is facilitated and, in addition, solid solution C is discharged from the ferrite phase to an austenite phase to clean the ferrite phase and improve the elongation. At the same time, since the austenite phase is stabilized, a martensite phase is generated even in a galvanizing line in which quenching is difficult so that formation of a multi phase is facilitated. In particular, in the cooling step thereof, an austenite phase is stabilized, formation of pearlite and bainite phases is suppressed and formation of the martensite phase is facilitated. Furthermore, Si in a solid solution with a ferrite phase facilitates work hardening to enhance elongation. In addition, a strain propagation property in the region on which the strain is concentrated is improved so that bendability is enhanced. Moreover, Si solid-solution strengthens the ferrite phase to reduce the difference in hardness between the ferrite and martensite phases, suppresses occurrences of cracking at the interface therebetween to improve local deformability, and contributes to an improvement in stretch frangeability and bendability. It is necessary that the amount of Si is specified to be 0.8% or more to obtain the above-described effects. On the other hand, if the amount of Si exceeds 2.5%, the transformation point increases significantly so that not only the production stability is impaired, but also an abnormal microstructure develops to deteriorate the formability. Therefore, the amount of Si is specified to be 0.8% or more, and 2.5% or less.

Mn: 1.5% to 3.0%

An element Mn is effective in preventing hot embrittlement of steel and ensuring strength. Furthermore, hardenability is improved and formation of a multi phase is facilitated. It is necessary that the amount of Mn is specified to be 1.5% or more to obtain the above-described effects. On the other hand, if the amount of Mn exceeds 3.0%, deterioration of the formability is invited. Therefore, the amount of Mn is specified to be 1.5% or more, and 3.0% or less.

P: 0.001% to 0.05%

An element P has a solid-solution strengthening function and can be added in accordance with a desired strength. Furthermore, P is an element effective in forming a multi phase because the ferrite transformation is facilitated. It is necessary that the amount of P is specified to be 0.001% or more to obtain the above-described effects. On the other hand, if the amount of P exceeds 0.05%, deterioration of weldability is invited. In addition, in the case where an alloying treatment of galvanization is conducted, the alloying rate is reduced and the quality of galvanization is impaired. Therefore, the amount of P is specified to be 0.001% or more, and 0.05% or less.

S: 0.0001% to 0.01%

S segregates at grain boundaries during hot working to embrittle steel and, in addition, is present as a sulfide to reduce local deformability. Consequently, it is necessary that the amount thereof is specified to be 0.01% or less, preferably 0.003% or less, and more preferably 0.001% or less. However, from limitations related to production technology, it is necessary that the amount of S is specified to be 0.0001% or more. Therefore, the amount of S is specified to be 0.0001% or more, and 0.01% or less, preferably 0.0001% or more, and 0.003% or less, and more preferably 0.0001% or more, and 0.001% or less.

Al: 0.001% to 0.1%

Al is effective in generating ferrite and improving balance between the strength and the elongation. It is necessary that the amount of Al is specified to be 0.001% or more to obtain the above-described effects. On the other hand, if the amount of Al exceeds 0.1%, deterioration of surface properties is invited. Therefore, the amount of Al is specified to be 0.001% or more, and 0.1% or less.

N: 0.0005% to 0.01%

N degrades the aging resistance of steel. In particular, if the amount of N exceeds 0.01%, the degradation of the aging resistance becomes significant. Preferably, the amount thereof is minimized. However, from limitations related to production technology, it is necessary that the amount of N is specified to be 0.0005% or more. Therefore, the amount of N is specified to be 0.0005% or more, and 0.01% or less.

Cr: 0.1% to 1.0%

Cr is very important in a manner similar to Si. Cr increases the second phase fraction during annealing, decreases the amount of C in untransformed austenite, facilitates an occurrence of self tempering in a cooling step after a galvanization treatment, reduces the hardness of a martensite phase in the final microstructure, and suppresses local deformation to distribute significantly to an improvement of stretch frangeability and bendability. Furthermore, Cr forms a solid solution with a carbide to facilitate formation of the carbide and allows self tempering to proceed in a very short time. At the same time, Cr has a function of suppressing generation of pearlite and bainite in the cooling step, and facilitates transformation of the austenite to the martensite so that the martensite which is subjected to self tempering thereafter can be generated at a sufficient fraction. It is necessary that the amount of addition of Cr is specified to be 0.1% or more to obtain the above-described effects. On the other hand, if the amount of Cr exceeds 1.0%, deterioration of the elongation is invited because, for example, the fraction of the second phase becomes too large and Cr carbides are generated excessively. Therefore, the amount of Cr is specified to be 0.1% or more, and 1.0% or less.

Ti: 0.0005% to 0.1%

Ti constitutes deposits together with C, S, and N to contribute effectively to improvement of strength and toughness. Furthermore, in the case where B is added, N is deposited as TiN. Consequently, deposition of BN is suppressed and effects of B, as described below, are exerted effectively. It is necessary that the amount of Ti is specified to be 0.0005% or more to obtain the above-described effects. On the other hand, if the amount of Ti exceeds 0.1%, deposition strengthening functions excessively and deterioration of the elongation is invited. Therefore, the amount of Ti is specified to be 0.0005% or more, and 0.1% or less.

B: 0.0003% to 0.003%

B coexisting with Cr plays a roll in promoting the above-described effects of Cr, that is, the effects of increasing the second phase fraction during annealing, decreasing the stability of austenite, and facilitating martensite transformation and the following self tempering in the cooling step after the galvanization. It is necessary that the amount of B is specified to be 0.0003% or more to obtain the above-described effects. On the other hand, if the amount of B exceeds 0.003%, deterioration of the elongation is invited. Therefore, B is specified to be 0.0003% or more, and 0.003% or less.

The remainder is composed of Fe and incidental impurities. However, besides these component elements, the following alloy elements can be added as necessary.

Nb: 0.0005% to 0.05%

Nb has an effect of increasing steel sheet strength and can be added as necessary to ensure desired strength. Since austenite generated through reverse transformation during annealing in the galvanizing line is made finer by addition of an appropriate amount, the microstructure of steel is made finer after the following steps of annealing to cooling to increase strength. Furthermore, fine Nb deposits are formed during hot rolling or in the steps of annealing to cooling in the galvanizing line to increase strength. If Nb is less than 0.0005%, the effect becomes poor. If Nb exceeds 0.05%, the microstructure is made excessively fine, and a favorable microstructure, as described later, cannot be obtained. Therefore, the Nb content is specified to be 0.0005% or more, and 0.05% or less.

At least one type of Mo: 0.01% to 1.0%, Ni: 0.01% to 2.0%, and Cu: 0.01% to 2.0%

Mo, Ni, and Cu not only play a roll as elements for solid-solution strengthening, but also stabilize the austenite phase in the cooling step in the annealing to facilitate formation of the multi phase. It is necessary that each of the amount of Mo, the amount of Ni, and the amount of Cu is specified to be 0.01% or more to obtain the above-described effects. On the other hand, if the amount of Mo exceeds 1.0%, the amount of Ni exceeds 2.0%, and the amount of Cu exceeds 2.0%, the coating property, formability, and spot weldability deteriorate. Therefore, the amount of Mo is specified to be 0.01% or more, and 1.0% or less, the amount of Ni is specified to be 0.01% or more, and 2.0% or less, and the amount of Cu is specified to be 0.01% or more, and 2.0% or less when being contained.

Ca: 0.001% to 0.005%

Ca has effects of depositing S as CaS, suppressing generation of MnS which promotes an occurrence and propagation of cracking, and improving stretch frangeability and bendability. It is necessary that the amount of Ca is specified to be 0.001% or more to obtain the above-described effects. On the other hand, if the amount of Ca exceeds 0.005%, the effects thereof are saturated. Therefore, the amount of Ca is specified to be 0.001% or more, and 0.005% or less when being contained.

2) Microstructure

Areal Fraction of Ferrite Phase: 30% or More

The high strength galvanized steel sheet is composed of a multi phase in which a hard martensite phase is primarily dispersed in a soft ferrite phase exhibiting high elongation. It is necessary that the areal fraction of ferrite phase is 30% or more to ensure sufficient elongation.

Areal Fraction of Martensite Phase: 30% or More, and 70% or Less

It is necessary that a martensite phase containing tempered martensite is included at an appropriate fraction to achieve a desired TS. It is necessary that the areal fraction of martensite phase containing tempered martensite is specified to be 30% or more to ensure the TS of 780 Mpa or more. On the other hand, if the areal fraction of martensite phase is excessively high, elongation deteriorates. If the martensite phase is included at an areal fraction exceeding 70%, sufficient elongation cannot be obtained. Therefore, the areal fraction of (whole) martensite is specified to be 30% or more, and 70% or less.

Proportion of Tempered Martensite Phase in Whole Martensite Phase: 20% or More

The tempered martensite phase is soft as compared with the martensite phase not subjected to tempering and improves local deformability by reducing the difference in hardness between ferrite and martensite phases to improve stretch frangeability and bendability. It is necessary that the proportion of a tempered martensite phase relative to the whole martensite phase is specified to be 20% or more on an areal fraction basis to exert the above-described effects sufficiently.

Proportion of Martensite Phase Having a Grain Diameter of 1 µM or Less in Whole Martensite Phase: 10% or Less Fine martensite having a grain diameter of 1 µm or less easily serves as a starting point of an occurrence of local cracking and degrades local deformability to adversely affect stretch frangeability and bendability. Therefore, it is necessary that the proportion of a martensite phase having a grain diameter of 1 µm or less relative to the whole martensite phase is specified to be 10% or less on an areal fraction basis.

Average Grain Diameter of Ferrite Phase: 3 µm or More (Favorable Condition)

The martensite phase distributes along ferrite grain boundaries. Consequently, in the case where the ferrite grain diameter is very small, the distribution of martensite phase becomes dense easily and cracking is allowed to propagate easily so that even when the fraction of the above-described tempered martensite is controlled, stretch frangeability and bendability may be adversely affected. Therefore, to suppress this, it is preferable that the average grain diameter of the ferrite phase is specified to be 3 µm or more.

Average Grain Diameter of Martensite Phase: 2 µm or More (Favorable Condition)

Even when the proportion of a martensite phase having a grain diameter of 1 µm or less relative to the whole martensite phase and the fraction of the tempered martensite are controlled, as described above, very fine martensite phase having an average grain diameter less than 2 µm easily serves as a starting point of an occurrence of local cracking and degrades the local deformability so that stretch frangeability and bendability may be adversely affected. Therefore, to suppress this, it is preferable that the average grain diameter of the martensite phase is specified to be 2 µm or more.

Furthermore, the microstructure may include a retained austenite phase, a pearlite phase, and a bainite phase within the bounds of not impairing the effects at a total areal fraction within the range of 20% or less, besides the ferrite and martensite phases.

Incidentally, the areal fractions of the ferrite phase and martensite phases refer to proportions of areas of individual phases in the observation area. Furthermore, the areal fractions of tempered martensite phase and martensite phase having a grain diameter of 1 µm or less refer to proportions of areas of the tempered martensite phase and the martensite phase having a grain diameter of 1 µm or less, respectively, relative to the area of the martensite phase. The above-described individual areal fractions and average grain diameters of ferrite and martensite phases can be determined by polishing a sheet thickness cross-section parallel to the rolling direction of the steel sheet, conducting corrosion with nital, conducting observation of 10 fields of view with SEM (scanning electron microscope) at a magnification of about 1,000 to 5,000 times in accordance with the dimension of the microstructure, and using a commercially available image processing software.

3) Production Condition

The high strength galvanized steel sheet can be produced by a method in which a steel sheet having the above-described component composition is heated to a temperature range higher than or equal to the Ac1 transformation point at an average heating rate of 5° C./s or more, soaking is conducted for 30 to 500 s in a temperature range of $(Ac_3-T1 \times T2)°$ C. or higher, and the Ac3 transformation point or lower, cooling to a temperature range of 550° C. or lower is conducted at an average cooling rate of 3° C./s to 30° C./s, galvanization is conducted and, thereafter, cooling is conducted at an average cooling rate of 30° C./s or less. The detailed description will be made below.

Heating Condition in Annealing: Heating to a Temperature Range Higher than or Equal to the Ac1 Transformation Point at an Average Heating Rate of 5° C./s or More Since heating to a Temperature range higher than or equal to the Ac1 transformation point at an average heating rate of 5° C./s or more can suppress recovery during heating and formation of recrystallized ferrite phase and disperse the ferrite phase and the austenite phase homogeneously during soaking so that stretch frangeability and bendability of a final microstructure can be improved.

Soaking condition in annealing: soaking for 30 to 500 s in a temperature range of $(Ac_3-T1 \times T2)°$ C. or higher, and the Ac3 transformation point or lower, while the above-described T1 and T2 are represented by Formula (1) and Formula (2) described below:

$$T1=120+22.5(\% \text{ Si})-40(\% \text{ Cr}) \quad \text{Formula (1)}$$

$$T2=0.3+0.075(\% \text{ Cr}) \quad \text{Formula (2)}$$

where in Formulae, (% M) represents a content (percent by mass) of an element M in the steel.

In the case where the austenite fraction increases during soaking, the C concentration in the austenite is reduced and the Ms point is raised so that a self tempering effect in the cooling step after the galvanization treatment can be obtained. Furthermore, even when the martensite hardness is reduced by tempering, still sufficient strength can be achieved and, thereby, sufficient strength and good local elongation can be obtained. It is necessary that a chemical composition is controlled appropriately and, in addition, the soaking temperature is specified to be within a temperature range of $(Ac_3-T1 \times T2)°$ C. or higher, and the Ac3 transformation point or lower expressed by using T1 and T2 determined on the basis of the amount of Si and the amount of Cr added. T1 and T2 are empirical equations determined from the results of various experiments we conducted, T1 indicates a temperature range in which ferrite and austenite coexist, and T2 indicate the ratio of a temperature range in which the austenite fraction in the soaking is sufficient for an occurrence of self tempering in a series of following steps to a temperature range in which the two phases coexist. If the soaking temperature is lower than $(Ac_3-T1 \times T2)°$ C., the austenite fraction is not sufficient so that self tempering does not occur, stretch frangeability and bendability are not improved and, in addition, the strength is reduced. If the soaking temperature exceeds the Ac3 transformation point, generation of ferrite is not sufficient and the elongation becomes insufficient.

Furthermore, the soaking time is specified to be 30 s or more, and 500 s or less. If the soaking time is less than 30 s, reverse transformation of ferrite generated during heating to austenite is insufficient, and a required austenite fraction cannot be obtained. If the soaking time exceeds 500 s, the effects are saturated and, in addition, productivity is impaired.

Cooling Condition in Annealing; Cooling to a Temperature Range of 550° C. or Lower at an Average Cooling Rate of 3° C./s to 30° C./s After soaking, it is necessary that cooling is conducted from the soaking temperature to a temperature range (cooling termination temperature) of 550° C. or lower at an average cooling rate of 3° C./s to 30° C./s. If the average cooling rate is less than 3° C./s, ferrite transformation proceeds during cooling, C is concentrated into untransformed austenite, and a self tempering effect is not obtained so that deterioration of stretch frangeability and bendability is invited. If the average cooling rate exceeds 30° C./s, the effect of suppressing ferrite transformation is saturated and, in addition, it is difficult to realize this with common production facilities.

Furthermore, if the cooling termination temperature exceeds 550° C., the martensite fraction is reduced significantly and becomes less than 30% because of generation of ferrite and pearlite so that a TS of 780 Mpa or more is not obtained.

After annealing, galvanization is conducted under a common condition.

It is preferable that a heat treatment is conducted for 20 to 150 s in a temperature range of 300° C. to 500° C. before galvanization is conducted after soaking and cooling.

Heat Treatment after Soaking and Cooling: 20 to 150 S in a Temperature Range of 300° C. to 500° C.

In the case where heat treatment is conducted for 20 to 150 s in a temperature range of 300° C. to 500° C. after annealing, a martensite phase is allowed to become soft more effectively through self tempering so that stretch frangeability and bendability can be further improved. If the heat treatment temperature is lower than 300° C., or if the heat treatment time is less than 20 s, such effects are small. On the other hand, if the heat treatment temperature exceeds 500° C. or if the heat treatment time exceeds 150 s, the hardness of the martensite phase is reduced significantly so that a TS of 780 Mpa or more is not obtained.

Furthermore, after annealing, galvanization can be subjected to an alloying treatment in a temperature range of 450° C. to 600° C. regardless of whether or not the above-described heat treatment is conducted. The Fe concentration in the coating becomes 8% to 12% by conducting the alloying treatment in a temperature range of 450° C. to 600° C. and, thereby, adhesion of the coating and corrosion resistance after painting are improved. If the temperature is lower than 450° C., alloying does not proceed sufficiently, deterioration of sacrificial protection performance and deterioration of sliding performance are invited. If the temperature exceeds 600° C., alloying proceeds excessively, reduces powdering performance, and large amounts of pearlite and bainite phases are formed. Hence, strength, stretch frangeability, and bendability are not improved.

The condition except the above description of the manufacturing method is not specifically limited. However, it is preferable that the production is conducted under the conditions described below.

A steel sheet before galvanization to be used for the high strength galvanized steel sheet is produced by hot rolling a slab having the above-described component composition and conducting cold rolling to a desired sheet thickness. Furthermore, it is preferable that a series of the above-described treatments, e.g., annealing, preheating treatment of the galvanization, galvanization, and alloying treatment of galvanization, are conducted with a continuous galvanizing line from the viewpoint of productivity.

The slab is produced preferably by a continuous casting method to prevent macrosegregation, but can also be produced by an ingot-making method or a thin slab casting method. When the slab is hot-rolled, the slab is heated again. It is preferable that the heating temperature is specified to be 1,150° C. or higher to prevent an increase in rolling load. Furthermore, to prevent an increase in scale loss and an increase in fuel consumption rate, it is preferable that an upper limit of the heating temperature is specified to be 1,300° C.

The hot rolling is conducted by rough rolling and finish rolling. It is preferable that finish rolling is conducted at a finishing temperature higher than or equal to the $Ar_3$ transformation point to prevent deterioration of the formability after the cold rolling and annealing.

Moreover, it is preferable that the finishing temperature is specified to be 950° C. or lower to prevent an occurrence of inhomogeneity in microstructure because of coarsening of crystal grains and an occurrence of scale defect.

Preferably, the steel sheet after the hot rolling is coiled at a coiling temperature of 500° C. to 650° C. from the viewpoints of preventing an occurrence of scale defect and ensuring good shapability.

Regarding the steel sheet after coiling, preferably, scales are removed by pickling or the like and, thereafter, cold rolling is conducted at a reduction rate of 40% or more to form a polygonal ferrite phase effectively.

Regarding galvanization, it is preferable that a galvanization bath containing 0.10% to 0.20% of Al is used. Furthermore, after the coating, wiping can be conducted to adjust the coating weight.

EXAMPLES

Steel Nos. A to K having component compositions shown in Table 1 were melted with a converter and made into slabs by a continuous casting method. The resulting slabs were heated to 1,200° C., hot-rolled at a finishing temperature of 850° C. to 920° C., and coiled at a coiling temperature of 600° C. Subsequently, after pickling, cold rolling was conducted to a sheet thickness shown in Table 2 at a reduction rate of 50%, and annealing was conducted under the annealing condition shown in Table 2 with a continuous galvanizing line. A part of steels were subjected to a heat treatment at 400° C. for times shown in Table 2 before galvanization. Thereafter, the steels were immersed into a galvanization bath containing 0.13% of Al at 475° C. for 3 s to form galvanization at an amount of adhesion of 45 g/m², and subjected to an alloying treatment at a temperature shown in Table 2 so that Galvanized steel sheet Nos. 1 to 20 were prepared.

As shown in Table 2, not all galvanized steels had been subjected to the heat treatment before galvanization and the alloying treatment.

TABLE 1

| Steel No. | C | Si | Mn | P | S | Al | N | Cr | Ti | B | Nb |
|---|---|---|---|---|---|---|---|---|---|---|---|
| A | 0.071 | 1.23 | 2.21 | 0.010 | 0.0019 | 0.024 | 0.0042 | 0.15 | 0.028 | 0.0016 | 0 |
| B | 0.11 | 1.45 | 2.42 | 0.023 | 0.0024 | 0.024 | 0.0046 | 0.33 | 0.021 | 0.0015 | 0 |
| C | 0.087 | 2.01 | 2.14 | 0.026 | 0.0009 | 0.029 | 0.0013 | 0.56 | 0.021 | 0.0008 | 0.023 |
| D | 0.121 | 1.08 | 2.55 | 0.017 | 0.0022 | 0.046 | 0.002 | 0.33 | 0.029 | 0.0017 | 0 |
| E | 0.138 | 1.72 | 2.37 | 0.011 | 0.0021 | 0.041 | 0.0023 | 0.98 | 0.025 | 0.0006 | 0 |
| F | 0.251 | 1.48 | 2.28 | 0.021 | 0.0021 | 0.026 | 0.0046 | 0.66 | 0.018 | 0.0004 | 0 |
| G | 0.091 | 0.35 | 2.53 | 0.029 | 0.0007 | 0.034 | 0.0038 | 0.45 | 0.028 | 0.0014 | 0 |
| H | 0.113 | 2.79 | 2.17 | 0.021 | 0.0008 | 0.019 | 0.0025 | 0.53 | 0.027 | 0.0007 | 0 |
| I | 0.081 | 1.36 | 2.43 | 0.010 | 0.0016 | 0.027 | 0.0013 | 0 | 0.019 | 0.0007 | 0 |
| J | 0.078 | 1.65 | 2.53 | 0.026 | 0.0011 | 0.028 | 0.0044 | 1.56 | 0.029 | 0.0015 | 0.022 |
| K | 0.116 | 1.32 | 2.67 | 0.024 | 0.0008 | 0.027 | 0.004 | 0.36 | 0.021 | 0 | 0 |

| Steel No. | Ni | Cu | Mo | Ca | T1 | T2 | Ac1 | Ac3 − T1 × T2 | Ac3 |
|---|---|---|---|---|---|---|---|---|---|
| A | 0 | 0 | 0 | 0 | 142 | 0.31 | 663 | 818 | 862 |
| B | 0 | 0 | 0 | 0 | 139 | 0.32 | 668 | 804 | 849 |
| C | 0 | 0 | 0.12 | 0 | 143 | 0.34 | 695 | 850 | 899 |
| D | 0.21 | 0.15 | 0 | 0 | 131 | 0.32 | 647 | 776 | 819 |
| E | 0 | 0 | 0 | 0.0022 | 120 | 0.37 | 686 | 805 | 850 |
| F | 0 | 0 | 0 | 0 | 127 | 0.35 | 675 | 737 | 781 |
| G | 0 | 0 | 0 | 0 | 110 | 0.33 | 649 | 760 | 797 |
| H | 0.18 | 0 | 0 | 0 | 162 | 0.34 | 696 | 864 | 919 |
| I | 0 | 0 | 0.23 | 0 | 151 | 0.30 | 664 | 821 | 866 |
| J | 0 | 0 | 0 | 0 | 95 | 0.42 | 705 | 830 | 869 |
| K | 0 | 0 | 0 | 0 | 135 | 0.33 | 664 | 785 | 830 |

TABLE 2

| Galvanized steel sheet No. | Steel No. | Sheet thickness (mm) | Annealing condition Heating Average rate (° C./s) | Heating Temperature (° C.) | Soaking Temperature (° C.) | Soaking Time (s) |
|---|---|---|---|---|---|---|
| 1 | A | 1.2 | 15 | 750 | 850 | 90 |
| 2 |   | 1.2 | 3 | 750 | 850 | 90 |
| 3 |   | 1.2 | 15 | 750 | 800 | 90 |
| 4 |   | 1.2 | 15 | 750 | 850 | 10 |
| 5 |   | 1.2 | 15 | 750 | 850 | 90 |
| 6 |   | 1.2 | 15 | 750 | 850 | 90 |
| 7 |   | 1.2 | 15 | 750 | 850 | 90 |
| 8 | B | 1.6 | 10 | 750 | 825 | 120 |
| 9 |   | 1.6 | 10 | 650 | 825 | 120 |
| 10 |   | 1.6 | 10 | 750 | 880 | 120 |
| 11 |   | 1.6 | 10 | 750 | 825 | 120 |
| 12 | C | 1.2 | 15 | 750 | 870 | 90 |
| 13 | D | 2.3 | 8 | 750 | 800 | 90 |
| 14 | E | 1.6 | 10 | 750 | 825 | 120 |
| 15 | F | 1.2 | 15 | 750 | 780 | 90 |
| 16 | G | 1.2 | 15 | 750 | 780 | 90 |
| 17 | H | 1.6 | 10 | 750 | 880 | 120 |
| 18 | I | 1.6 | 10 | 750 | 850 | 120 |
| 19 | J | 2.3 | 8 | 750 | 850 | 90 |
| 20 | K | 1.2 | 15 | 750 | 800 | 90 |

| Galvanized steel sheet No. | Annealing condition Cooling Average rate (° C./s) | Cooling Termination temperature (° C.) | Treatment before galvanization (s) | Alloying temperature (° C.) | Cooling rate after galvanization (° C./s) |
|---|---|---|---|---|---|
| 1 | 15 | 525 | — | 525 | 10 |
| 2 | 15 | 525 | — | 525 | 10 |

TABLE 2-continued

| | | | | | |
|---|---|---|---|---|---|
| 3 | 15 | 525 | — | 525 | 10 |
| 4 | 15 | 525 | — | 525 | 10 |
| 5 | 2 | 525 | — | 525 | 10 |
| 6 | 15 | 600 | — | 525 | 10 |
| 7 | 15 | 525 | — | 525 | 50 |
| 8 | 10 | 525 | — | 525 | 8 |
| 9 | 10 | 525 | — | 525 | 8 |
| 10 | 10 | 525 | — | 525 | 8 |
| 11 | 10 | 525 | — | 625 | 8 |
| 12 | 15 | 525 | 50 | 525 | 10 |
| 13 | 6 | 525 | — | — | 6 |
| 14 | 10 | 525 | — | 525 | 8 |
| 15 | 15 | 525 | — | 525 | 10 |
| 16 | 15 | 525 | — | 525 | 10 |
| 17 | 10 | 525 | — | 525 | 8 |
| 18 | 10 | 525 | — | 525 | 8 |
| 19 | 6 | 525 | — | 525 | 6 |
| 20 | 15 | 525 | 50 | 525 | 10 |

Regarding the galvanized steel sheet prepared as described above, the areal fraction of each of the ferrite phase, the martensite phase, the tempered martensite phase, and the martensite phase having a grain diameter of 1 μm or less, and the average grain diameters of the ferrite and martensite phases were measured.

Regarding a measuring method for the microstructure, a sheet thickness cross-section parallel to the rolling direction of the steel sheet was subjected to corrosion with nital, an appeared microstructure was magnified with a scanning electron microscope (SEM) by 5,000 times, and the ferrite phase, the martensite phase, and the tempered martensite phase were identified. This was analyzed by using image analyzing software (Image-Pro; produced by Cybernetics), the areal fractions of individual phases were determined, and the proportion of the tempered martensite phase relative to the whole martensite phase was calculated. The area occupied by each of crystal grains of ferrite and martensite phases was derived. The areas were averaged on a phase basis, and the square root thereof was assumed to be an average crystal grain diameter of each phase. Furthermore, the martensite phase having a grain diameter of 1 μm or less was extracted. The areal fraction thereof was derived and a proportion relative to the whole martensite phase was calculated.

Moreover, a JIS No. 5 tensile test specimen was taken in a direction perpendicular to the rolling direction, and a tensile test was conducted at a cross head speed of 20 mm/min on the basis of JIS Z 2241 so that TS and total elongation El were measured. In addition, a specimen of 100 mm×100 mm was taken and a hole expanding test was conducted three times on the basis of JFST 1001 (the Japan Iron and Steel Federation Standard) to determine an average hole expanding ratio λ (%) and evaluate the stretch frangeability. Furthermore, a strip specimen of 30 mm wide×120 mm long was taken in a direction perpendicular to the rolling direction, and end portions were smoothed in such a way that the surface roughness Ry becomes 1.6 to 6.3 S. Thereafter, a bending test was conducted by a pressing bend method at a bending angle of 180°, and a minimum bending radius at which cracking and necking do not occur was determined as a limit bending radius.

The results obtained as described above are shown in Table 3.

TABLE 3

| | | Microstructure | | | | | |
|---|---|---|---|---|---|---|---|
| Galvanized steel sheet No. | Steel No. | Ferrite phase areal fraction (%) | Martensite phase areal fraction (%) | Ratio of tempered martensite phase (%) | Ratio of martensite phase of 1 μm or less (%) | Ferrite phase average grain diameter (μm) | Martensite phase average grain diameter (μm) |
| 1 | A | 69 | 31 | 67 | 0 | 7.7 | 4.0 |
| 2 | | 80 | 20 | 12 | 21 | 9.6 | 1.6 |
| 3 | | 86 | 14 | 0 | 65 | 9.0 | 1.7 |
| 4 | | 81 | 19 | 0 | 30 | 8.6 | 2.6 |
| 5 | | 84 | 10 | 0 | 72 | 9.1 | 1.8 |
| 6 | | 65 | 12 | 15 | 58 | 8.0 | 1.9 |
| 7 | | 68 | 32 | 7 | 0 | 7.9 | 4.3 |
| 8 | B | 62 | 38 | 77 | 0 | 5.8 | 3.4 |
| 9 | | 78 | 22 | 15 | 17 | 6.8 | 1.7 |
| 10 | | 28 | 64 | 75 | 0 | 4.8 | 5.8 |
| 11 | | 63 | 8 | 0 | 0 | 6.4 | 2.5 |
| 12 | C | 65 | 35 | 78 | 0 | 5.2 | 3.8 |
| 13 | D | 54 | 46 | 80 | 0 | 4.8 | 4.2 |
| 14 | E | 49 | 51 | 73 | 0 | 4.4 | 4.2 |
| 15 | F | 18 | 82 | 6 | 0 | 3.2 | 6.5 |
| 16 | G | 56 | 21 | 21 | 26 | 2.8 | 1.6 |
| 17 | H | 71 | 29 | 0 | 42 | 6.4 | 1.0 |
| 18 | I | 73 | 27 | 0 | 34 | 5.8 | 1.7 |
| 19 | J | 28 | 72 | 92 | 0 | 5.3 | 5.0 |
| 20 | K | 65 | 19 | 79 | 0 | 5.1 | 4.1 |

TABLE 3-continued

| Galvanized steel sheet No. | Tensile characteristic | | | | Limit bending R(mm) | Remarks |
| --- | --- | --- | --- | --- | --- | --- |
| | TS(MPa) | El(%) | TS × El(MPa %) | λ (%) | | |
| 1 | 856 | 23 | 19688 | 49 | 0.5 | Invention example |
| 2 | 776 | 25 | 19400 | 14 | 1 | Comparative example |
| 3 | 760 | 26 | 19760 | 12 | 1.5 | Comparative example |
| 4 | 821 | 25 | 20525 | 21 | 0.5 | Comparative example |
| 5 | 757 | 25 | 18925 | 15 | 1 | Comparative example |
| 6 | 723 | 23 | 16629 | 25 | 0.5 | Comparative example |
| 7 | 895 | 23 | 20585 | 17 | 1 | Comparative example |
| 8 | 1082 | 18 | 19476 | 47 | 1 | Invention example |
| 9 | 978 | 17 | 16626 | 18 | 2 | Comparative example |
| 10 | 969 | 18 | 17442 | 35 | 1.5 | Comparative example |
| 11 | 967 | 16 | 15472 | 48 | 1.5 | Comparative example |
| 12 | 1027 | 20 | 20540 | 47 | 1 | Invention example |
| 13 | 1212 | 16 | 19392 | 41 | 1 | Invention example |
| 14 | 1379 | 14 | 19306 | 43 | 1 | Invention example |
| 15 | 1507 | 13 | 19591 | 6 | 4.5 | Comparative example |
| 16 | 1089 | 14 | 15246 | 36 | 1 | Comparative example |
| 17 | 1017 | 22 | 22374 | 10 | 1.5 | Comparative example |
| 18 | 1045 | 18 | 18810 | 14 | 1.5 | Comparative example |
| 19 | 1090 | 13 | 14170 | 54 | 2 | Comparative example |
| 20 | 1102 | 14 | 15428 | 25 | 1.5 | Comparative example |

It is clear that all galvanized steel sheets of our examples are high strength galvanized steel sheets excellent in formability because the TS is 780 MPa or more, the hole expanding ratio λ is 40% or more, and the limit bending radius is 1.0 mm or less and, therefore, excellent stretch frangeability and bendability are exhibited. Furthermore, TS×El≥18,000 MPa·% is satisfied and, therefore, there is a high balance between the strength and the elongation.

The invention claimed is:

1. A high strength galvanized steel sheet excellent in formability comprising a component composition containing C: 0.05% to 0.15%, Si: 0.8% to 2.5%, Mn: 1.5% to 3.0%, P: 0.001% to 0.05%, S: 0.0001% to 0.01%, Al: 0.001% to 0.1%, N: 0.0005% to 0.01%, Cr: 0.1% to 1.0%, Ti: 0.0005% to 0.1%, B: 0.0003% to 0.003%, and the remainder composed of iron and incidental impurities, on a percent by mass basis, and a microstructure including 30% or more of ferrite phase and 30 to 70% on an areal fraction basis of whole martensite phase which is martensite phase containing tempered martensite phase, wherein a proportion of a tempered martensite phase is 20% or more relative to the whole martensite phase and a proportion of a martensite phase having a grain diameter of 1 μm or less is 10% or less relative to the whole martensite phase and the steel sheet has a tensile strength TS of 950 to 1379 MPa.

2. A high strength galvanized steel sheet excellent in formability comprising a component composition containing C: 0.05% to 0.15%, Si: 0.8% to 2.5%, Mn: 1.5% to 3.0%, P: 0.001% to 0.05%, S: 0.0001% to 0.01%, Al: 0.001% to 0.1%, N: 0.0005% to 0.01%, Cr: 0.1% to 1.0%, Ti: 0.0005% to 0.1%, B: 0.0003% to 0.003%, and the remainder composed of iron and incidental impurities, on a percent by mass basis, and a microstructure including 30% or more of ferrite phase and 30 to 70% on an areal fraction basis of whole martensite phase which is martensite phase containing tempered martensite phase, wherein a proportion of a tempered martensite phase is 20% or more relative to the whole martensite phase and a proportion of a martensite phase having a grain diameter of 1 μm or less is 10% or less relative to the whole martensite phase and the steel sheet has a tensile strength TS of 1027 to 1379 MPa.

* * * * *